July 25, 1950  S. H. NORTON  2,516,795
VALVE ROTATING DEVICE
Filed Aug. 28, 1946  2 Sheets-Sheet 1

INVENTOR.
Samuel H. Norton
BY
ATTYS

July 25, 1950　　　　　S. H. NORTON　　　　　2,516,795
VALVE ROTATING DEVICE
Filed Aug. 28, 1946　　　　　　　　　　　　2 Sheets-Sheet 2
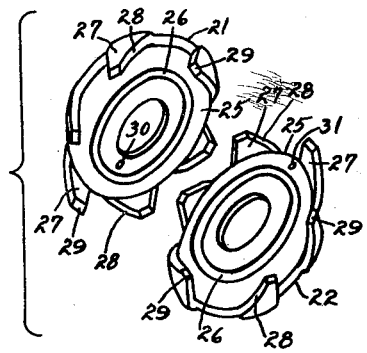
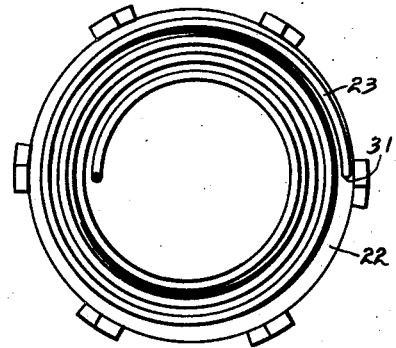
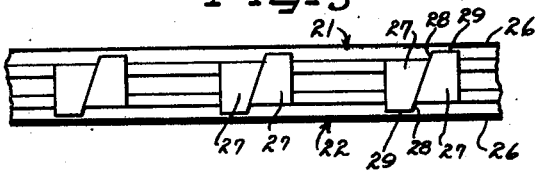
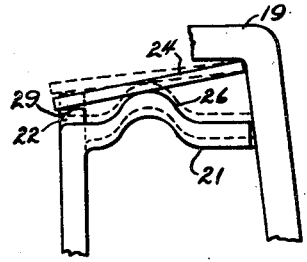
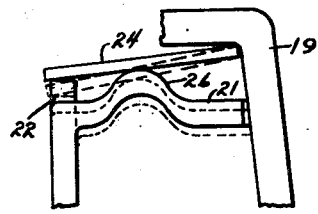
INVENTOR.
Samuel H. Norton
BY
ATTYS

UNITED STATES PATENT OFFICE 2,516,795

VALVE ROTATING DEVICE

Samuel H. Norton, Cleveland, Ohio, assignor to Thompson Products, Inc., Cleveland, Ohio, a corporation of Ohio Application August 28, 1946, Serial No. 693,413

17 Claims. (Cl. 123—90)

My invention relates to valve-rotating devices, and more particularly to self-contained devices for automatically rotating poppet valves in accordance with the cyclic operation thereof.

In the application of valves to open and close the intake and exhaust ports of an internal combustion engine, it is highly desirable that deterioration of the valve due to the extreme conditions within the combustion chamber be minimized. This deterioration takes the form of carbon deposits, warping, pits, and unevenness of wear of the valve in its contact with the valve seat. In addition, deposits of carbon or other material at a particular point on the valve seat tend to cause recurrent bending of the valve stem, and may result in a permanent set thereon, thus causing uneven valve-seating engagement. All of these deteriorating effects tend to cause valve leakage and corresponding loss of compression, thereby reducing the efficiency of the engine and causing uneven operation thereof.

One method of reducing carbon deposits and valve wear in internal combustion engines is to rotate the valves as the engine operates. This rotation causes the valves continually to seat in different angular relationship with respect to the cylinder head, and consequently evens out any tendency towards carbon deposits and wear associated with particularly severe conditions at any portion of the valve or seat. Furthermore, the valve does not acquire a recurrent bending force in the same direction when a deposit occurs at a particular point on the valve seat. The valve then operates in an efficient manner for a long period of time, and engine outage and maintenance expense is reduced accordingly.

It is an object of my invention to provide improved means whereby a poppet type valve is progressively rotated in accordance with the opening and closing thereof.

A further object of my invention is to provide an improved valve-rotating mechanism wherein the rotation of the valve occurs only in the open condition, thus avoiding any tendency to rotate during the time the valve and seat are engaged, and eliminating valve wear that would otherwise be associated with such rotation.

Another object of my invention is to provide an improved valve-rotating device suitable for use in internal combustion engines, and which can be substituted for the conventional valve spring retainer mechanism without change in the co-operating parts, thus simplifying replacement and reducing cost of manufacture.

Still another object of my invention is to provide an improved valve-rotating device that is simple in construction and reliable in operation, and has minimum wear along rubbing surfaces.

Yet another object of my invention is to provide an improved valve-rotating device wherein a minimum number of easily manufactured parts are used, and are assembled in a simple and convenient manner to the end that manufacturing costs are reduced to a minimum.

My invention further resides in features of construction, combination, and arrangement whereby a valve-rotating device particularly suitable for use in reciprocating internal combustion engines is provided.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing.

On the drawings:

Figure 3 is an exploded isometric view of the valve-rotating members of the device of Figures 1 and 2.

Figure 4 is a plan view of the lower valve-rotating member taken from a point immediately above the biasing spring.

Figure 5 is a developed view of the tapered lug portions of the valve-rotating members when in engagement.

Figure 6 is a transverse sectional isometric view of the spring washer used in the device of Figures 1 and 2.

Figures 7 and 8 are enlarged fragmentary somewhat diagrammatic views showing the disposition of the members of the device of Figures 1 and 2 in the closed and open positions, respectively.

As shown on the drawings:

Figure 1:
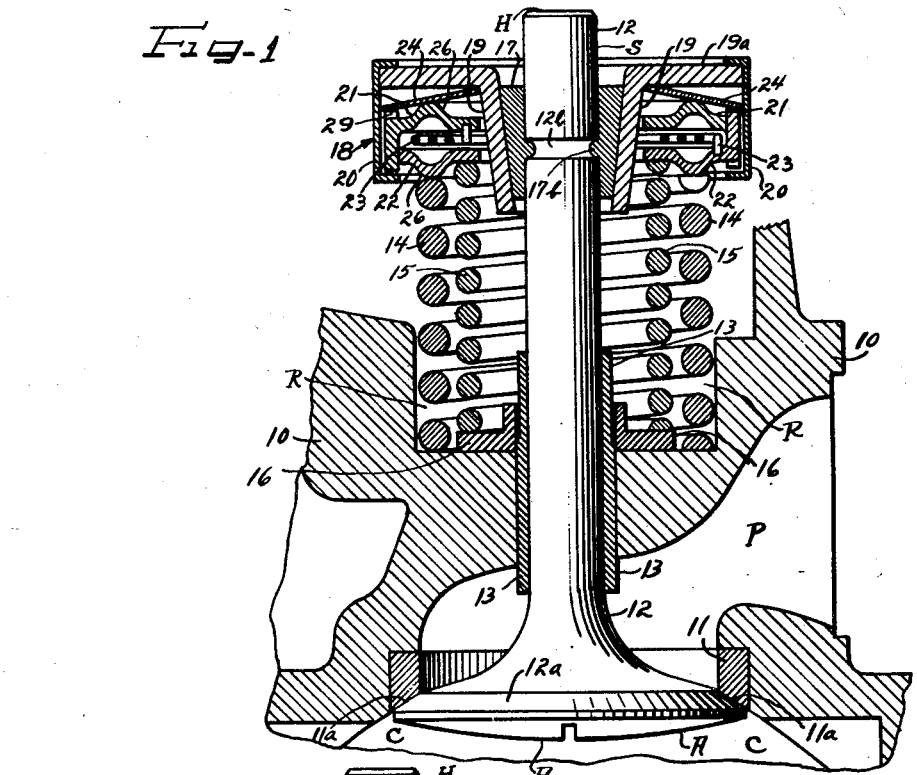
Figures 1 and 2 are longitudinal cross-sectional views of a rotating device for a poppet-type valve of an internal combustion engine, and showing the closed and open positions thereof, respectively.
Figure 2:
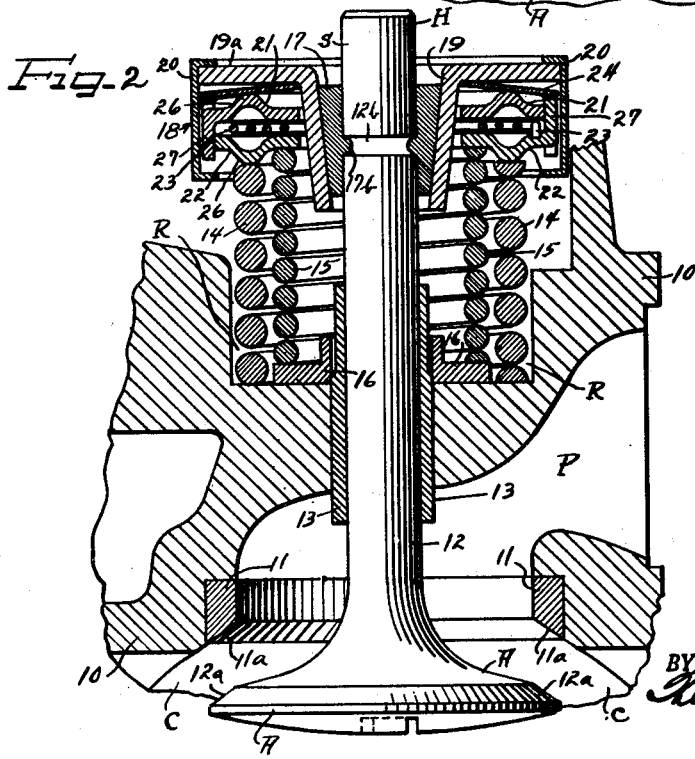

Referring now to Figures 1 and 2, the reference numeral 10 designates an engine part such as, for example, a portion of the cylinder head of a radial type aircraft engine. The engine part defines a combustion chamber C and a port P, such as an exhaust port communicating with the chamber. A valve seat ring 11 is secured in the mouth of the port P and has a beveled seating face 11a facing the combustion chamber C. A poppet valve 12 has a head A for closing the port P, and a stem S slidably mounted in a stem guide 13 carried by the engine part 10. The valve head A has a beveled seating face 12a to cooperate with the seat 11a of ring 11 to form a seal in the closed position (Figure 1). The stem guide 13 projects through a wall of engine part 10 to a recess R therein. A heavy valve spring 14 is bottomed on the lower portion of the recess R, and a lighter valve spring 15 nested within spring 14 is bottomed on a seat member 16. The member 16 embraces the projecting end of the guide 13 and is likewise bottomed on the lower part of the recess R.

The valve stem S has a conventional annular retainer lock groove 12b near the tip end thereof, this groove coacting with the beads 17b of retainer locks 17.

The valve-rotating device of this invention, shown generally at 18, is interposed between the retainer lock 17 and the springs 14 and 15 for automatically rotating the valve 12 over a slight angle relative to the engine part 10 each time the valve passes through one cycle of opening and closing.

The valve-rotating device 18 includes the valve retainer cap 19 held by retainer lock 17 so that angular or axial motion of valve stem S causes corresponding motion of valve retainer cap 19. Collar 20 encircles valve retainer cap 19 and extends downwardly therefrom to retain and protect the other portions of the mechanism. Underneath the flange 19a of valve retainer cap 19 is mounted respectively, conical spring washer 24 (which may, for example, be a "Belleville Spring"), upper valve-rotating member 21, torsional spring 23, and lower valve-rotating member 22, these members coacting to rotate valve 12 in a manner to be described in further detail hereafter.

The construction of upper valve-rotating member 21 and lower valve-rotating member 22 may best be understood by reference to Figure 3, which shows these two members in exploded relationship. As will be observed from this Figure 3, each member contains a flat, centrally apertured washer portion 25 having an annular projection 26. Projection 26 extends in the upward direction in the case of valve-rotating member 21, and the downward direction in the case of lower valve-rotating member 22, as will be evident from examination of Figures 1 and 2. Lugs 27 are provided on the periphery of members 21 and 22, these lugs extending in the axial direction opposite to the annular projection 26 and having a circumferentially tapered or inclined side edge on at least one side edge thereof. A flat surface or end wall 29 is provided on the top of each lug 27. As will be evident from Figures 1 and 2, members 21 and 22 are mounted in opposed relation about the axis of valve 12 so that lugs 27 project in opposite axial directions. The torsion spring 23 is mounted between these members and resiliently biases together the inclined side faces 28 of the lugs 27 by reason of its engagement with spring hole 30 on member 21 and spring hole 31 on member 22. This engagement may be understood by reference to Figure 4 which shows a view of lower valve-rotating member 22 as seen from a position immediately above spring 23.

As illustrated in the developed view of Figure 5, the mating inclined sides 28 of the lugs 27 on the two washer members 21 and 22 will cause relative rotation of the members whenever they are subjected to axial loads which move them toward each other. This relative rotation of the members further winds up the torsion spring 23 and when the axial loads on members 21 and 22 are released, the tightened spring 23 causes the lugs 27 of one member to climb up on the inclined surfaces of the lugs of the other member, thereby reclaiming the original axial and radial positions of the members.

The construction of spring washer 24 may best be understood from the cross section view of Figure 6. As shown in this view, this washer is in the form of a truncated cone, the axis of which passes through the center of the circle formed by the washer and is perpendicular to a plane drawn through the lower edge thereof. This spring is made up of resilient material so that, as pressure is exerted against it in the axial direction, resilient opposition to such pressure is developed, the opposing force varying in accordance with the deflection.

Having described the construction of an illustrative embodiment of my invention, I will now indicate the operation thereof.

Figure 1 shows the positioning of the parts when valve 12 is closed. As is evident from this figure, springs 14 and 15 are in relatively extended position, and produce a minimum degree of upward force on the under surface of lower valve-rotating member 22. In this case, the axial pressure exerted against spring washer 24 is relatively small, and that washer accordingly assumes a shape having a relatively large angle with respect to the lower surface of flange 19a of valve retainer cap 19. By reason of this relatively great angle, there is little force exerted between spring washer 24 and the annular upwardly projecting portion 26 of upper valve-rotating member 21. Instead, spring washer 24 rests primarily against the surfaces 29 of lugs 27 of lower valve-rotating member 22. In this position, the upper valve-rotating member 21 is substantially free except for the rotational forces exerted thereon by torsion spring 23, which is of size sufficiently only to rotate member 21 relative to member 22 when the former is substantially free. Thus, spring 23 rotates upper valve-rotating member 21 until the angular surfaces 28 of the lugs 27 of members 21 and 22 engage, and the force exerted by the annular upwardly projecting portion 26 of member 21 against spring washer 24 is sufficient to prevent further axial displacement of members 21 and 22.

An enlarged cross-sectional view of the upper valve-rotating member 21, the lower valve-rotating member 22, spring washer 24, and valve retaining cap 19 is shown in Figure 7 for the valve in closed position of Figure 1. It will be evident from this figure that spring washer 24 touches against the upper portion 29 of lugs 27 of lower valve-rotating member 22, but derives little axial support from upper valve-rotating member 21.

The relative positions of the parts of the device when the valve is in open position are illustrated in Figures 2 and 8. In the open position of the valve, the closure springs 14 and 15 are compressed, and exert increased axial loads on the device. These increased loads must be transmitted to the valve through the dished spring or washer 24 and, as explained above, the spring washer 24 is deflected by the increased loads to assume a flatter angle. As the angle or inclination of the spring washer decreases, the outer periphery or rim of the spring tends to move at a faster rate than the intermediate portion opposing the projection 26 on the member 21. The ends 29 of the lugs 27 on member 22 thereby exert less axial force on the spring, until the spring may swing entirely free of these lugs. While the increased axial load of the closure springs 14 and 15 is then transferred to the spring 24 mainly through the projection 26 of member 21, this load must be transmitted through the surfaces 28 of the mating lugs on both members 21 and 22. Since these surfaces are inclined or tapered, member 21 will be rotated or radially shifted relative to member 22. This rotation is transmitted to the valve through the projection 26 which engages the spring 24 and through the spring 24 to the retainer 19 affixed to the valve. The springs 14 and 15 hold the member 22 against rotation. As the member 21 rotates relative to the member 22, the torsion spring 23 is tightened or wound up.

When the valve is allowed to close, the closure springs 14 and 15 will be expanded, and will exert less axial loads on the valve and on the rotating device. The member 22 will be lowered due to the retraction of the spring washer 24 to its inclined position. The outer rim or periphery of the washer 24, as it resumes its initial inclined position, will tend to move faster than the intermediate portion of the spring contacted by the projection 26 of the member 21, and as the spring assumes its inclined position, it will tend to be raised from projection 26 to free the member 21 from the spring. Member 21 will thereby be released from the restraining torque due to frictional engagement of projection 26 with member 24 and torsion spring 23 will thereupon rotate the member 21 back to its initial position with the lugs thereof engaging the lugs of the member 22.

If desired, the angularly disposed surfaces 28 of lugs 27 may be arranged to permit some opening of the valve before any tendency to rotate is produced. This may, for example, be accomplished by providing a vertical surface at the tip of each lug, thereby permitting members 21 and 22 to be compressed a predetermined distance before relative rotation is imparted to them by the wedge action of the lugs.

The device of this invention is readily interposed between the closure spring and the spring retainer of a poppet valve assembly and operates by rotatably driving the valve whenever the closure spring exerts increased axial loads on one of the parts thereof. This part thereupon deflects a spring washer into engagement with a second part, and inclined surfaces on the first and second parts cause rotation of the second part relative to the first part for rotating the valve. With the increased axial loads on the first part diminished, when the valve reaches closed position, the spring washer resumes its initial position and re-engages the first part to free the second part for rotation. A torsion spring between the parts thereupon returns the second part to its starting position.

I claim as my invention:

1. A device for effecting relative rotation between two members when subjected to increasing loads which comprises adjacent relatively rotatable parts having coacting angular surfaces disposed to rotate said parts relative to each other, means biasing said parts to engage said surfaces and produce a predetermined angular relation therebetween, means connecting said parts to said members as said loads increase in value, whereby said members are rotated relative to each other, said biasing means being too weak to cause relative rotation of said parts when compressed by said members so that said parts retain their shifted positions until the load is removed from said members, whereby successive applications of load to said members produce progressive angular movements therebetween.

2. A device for effecting relative rotation between two members when subjected to increasing loads which comprises adjacent relatively rotatable parts having coacting angular surfaces disposed to rotate said parts relative to each other, means biasing said parts to engage said surfaces and produce a predetermined angular relationship therebetween, means to shift said load to said parts as said loads increase in value, thus to compress said parts relative to each other and rotate said members relative to each other, said biasing means being too weak to cause relative rotation of said parts when said load is applied thereto so that said parts retain their rotated positions until said load is shifted therefrom, whereby successive applications of load cause progressive angular movement of said members relative to each other.

3. A device for effecting relative rotation between two members when subjected to increasing loads which comprises adjacent relatively rotatable parts having coacting angular surfaces disposed to rotate said parts relative to each other, means biasing said parts to engage said surfaces and produce a predetermined angular relation therebetween, means to oppose said loads, said means being directly engageable with said members in the unloaded condition and engageable with said members through said parts in the loaded condition, whereby said parts are compressed relative to each other and said members are rotated relative to each other as said loads are increased, said biasing means being too weak to cause relative rotation of said parts when in the compressed condition so that said parts and said members retain their maximum shifted positions until said load is removed, whereby successive applications of load cause progressive angular movements of said members relative to each other.

4. A device for effecting relative rotation between two members when subjected to recurrent loads which comprises adjacent relatively rotatable parts having coacting angular surfaces disposed to rotate said parts relative to each other, means biasing said parts to engage said surfaces and produce a predetermined angular relation therebetween, means to oppose said loads, a conical spring washer having one periphery engageable with said last means and the other periphery engageable with one of said members, said washer also being engageable along an arc of intermediate radius with said last means through said parts, whereby said parts are compressed relative to each other and said members are rotated relative to each other as said loads are increased, said biasing means being too weak to cause relative rotation of said parts when in the compressed condition so that said parts retain their shifted position until said loads are removed and repeated applications of loads cause successive incremental angular movement of said members relative to each other.

5. A device for effecting relative rotation between two members when subjected to recurrent loads which comprises adjacent relatively rotatable parts having coacting angular surfaces disposed to rotate said parts relative to each other, means resiliently biasing said parts to engage said surfaces and produce a predetermined angular relation therebetween, means to oppose said loads, a conical spring washer having one periphery engageable with said last means and the other periphery engageable with one of said members, said washer also being engageable along an arc of intermediate radius with said last means through said parts, whereby said parts are compressed relative to each other and said members are rotated relative to each other as said loads are increased, said biasing means being too weak to cause relative rotation of said parts when in the compressed condition so that said parts retain their shifting position until said loads are removed and recurrent applications of loads cause successive incremental angular movement of said members relative to each other.

6. A device for effecting relative rotation of two members upon recurrent displacements therebetween including two washers having tapered axially extending lugs, said washers being mounted in opposed relation, means to bias said washers to cause engagement of the tapered portions of said lugs whereby axial compression causes positive relative rotation therebetween, means to oppose displacement of said members, said last means exerting increased axial pressure between said washers as said washers are displaced, thus to compress said washers and rotate said members relative to each other, said biasing means being incapable of relatively rotating said washers when compressed relative to each other, whereby said rotation of said washers is retained until the displacement of said members relative to each other is reduced and successive displacement of said members relative to each other causes successive increments of rotation therebetween.

7. A device for effecting relative rotation of two members upon recurrent displacements therebetween including two washers having tapered axially extending lugs, said washers being mounted in opposed relation, means to bias said washers to cause engagement of the tapering portions of said lugs, whereby axial compression of said washers causes positive relative rotation thereof, a conical spring washer disposed to cause increased axial pressure between said washers as said members are displaced relative to each other, thus to compress said washers and rotate said members relative to each other, said biasing means being incapable of relatively rotating said washers when said axial pressure is increased, whereby the rotation of said washers associated with said compression is retained until displacement of said members is reduced and successive displacements of said members relative to each other cause successive increments of rotation therebetween.

8. A device for effecting relative rotation of two members upon recurrent displacements therebetween including two washers having tapered axially extending lugs, said washers being mounted in opposed relation, means to bias said washers to cause engagement of the tapering portions of said lugs, whereby axial compression of said washers causes positive relative rotation therebetween, a conical spring washer having points on its inner periphery in engagement with one of said members, points on its outer periphery in engagement with the other of said members, and points of intermediate radius in engagement with the other of said members through said washers, said biasing means being incapable of relatively rotating said washers when compressed by said members through said spring washer, whereby successive axial displacements of said members relatively to each other cause successive increments of rotation therebetween.

9. A valve-rotating device comprising a valve assembly, two washers with circumferentially tapered axially extending lugs, said washers being mounted in opposed relation, means to bias said washers to cause engagement of said tapered portions of said lugs, whereby axial compression of said washers causes positive relative rotation therebetween, a conical spring washer having points on a circle of one radius in engagement with said valve assembly, biasing means operative to urge points on a circle of some other radius of said washer in direction tending to close said valve, said washer having points on a circle of an intermediate radius of said spring washer in engagement with said last means through said washers, said biasing means being incapable of relatively rotating said washers when said members are compressed by said valve through said spring washer, whereby successive displacements of said valve assembly cause cumulative increments of rotation thereof.

10. In combination, a valve, a valve seat member coacting therewith, springs to oppose opening of said valve, and means interposed between said springs and said valve, said means including two washers having circumferentially tapered axially extending lugs, said washers being mounted in opposed relation, means to bias said washers to cause engagement of said tapered portions of said lugs whereby axial compression of said washers causes positive relative rotation therebetween, a conical spring washer interposed between said means and said springs and positioned to cause points on a circle of one radius thereof to partake of the movement of said valve, points on a circle of another radius thereof to partake of the movement of said springs, and points on a circle of an intermediate radius thereof to engage said springs through said washers thus to cause transfer of force to said washers as said valve is depressed, said biasing means being incapable of relatively rotating said washers when predetermined axial force is transferred therethrough, thus causing successive valve opening cycles to rotate said valve through cumulative angular increments.

11. In combination, a valve, springs to oppose opening of said valve, means interposed between said springs and said valve, said means including two washers having circumferentially tapered axially extending lugs, said washers being mounted in opposed relation, means to bias said washers to cause engagement of said tapered portions of said lugs, whereby axial compression of said washers causes positive relative rotation therebetween, a conical spring washer positioned to cause points on a circle of one radius thereof to partake of the movements of said valve, points on a circle of another radius thereof to partake of the movements of said spring, and points on a circle of an intermediate radius thereof to engage said spring through said washers, thus to cause transfer of force to said washers as said valve is depressed, said biasing means being incapable of relatively rotating said washers when predetermined axial force is transferred therethrough, thus causing successive valve opening cycles to rotate said valve through cumulative angular increments.

12. In combination, a valve, a spring to oppose opening of said valve, a valve spring retainer on said valve, means connecting said spring to said valve spring retainer, said means including two washers having circumferentially tapered axially extending lugs and oppositely disposed annular projections, said washers being axially aligned in opposed relation, means to bias said washers to cause engagement of said tapered portions of said lugs, whereby axial compression of said washers causes positive relative rotation therebetween, a conical spring washer having its inner periphery in engagement with said valve spring retainer and its outer periphery in engament with said lugs on one of said washers, said one washer being in engagement with said spring, thus to cause transfer of force from said lugs of said one washer to said projection of said other washer as said valve is depressed, said biasing means being incapable of relatively rotating said washer when predetermined axial force is being transferred therethrough, thus causing successive valve-opening cycles to rotate said valve through progressive angular increments.

13. In a device for effecting relative rotation of members, a first washer having axially extending lugs, a second washer coaxially disposed with respect to said first washer and having an axially extending portion at a smaller radius than the lugs of said first washer and extending in opposite axial direction, said washers defining mating surfaces disposed at an angle to the axis of said washers to cause positive relative rotation thereof as said washers are axially compressed relative to each other, means angularly biasing said washers to engage said surfaces, a conical spring washer, the outer periphery of said washer being disposed to engage said lugs of said first washer and the inner periphery of said washer being disposed to engage one of said members, the other said members being disposed to partake of the movement of said other washer, thus to cause engagement between said projections of said second washer and said spring washer as said members are compressed and to rotate said members relative to each other, said means being incapable of rotating said washers in the compressed position so that successive displacements of said members relative to each other cause progressive angular movements therebetween.

14. In a device for effecting relative rotation of members, two washers having circumferentially tapered axially extending lugs, said washers being coaxially mounted in opposed relation, and means rotatably biasing said washers to maintain engagement of said lugs, said biasing means being incapable of rotating said washers when said washers are in the compressed position, whereby axial loads on said washers causes positive relative rotation thereof and release of said loads causes said means to return said washers to normal relative angular relationship.

15. A device adapted for rotating a poppet valve as it is axially shifted from closed to open position which comprises a first non-rotatable member, a second rotatable member, deflectable means interposed between said members and said valve, said deflectable means being biased from said first member onto said second member whenever said valve is axially shifted, mating means on said first and second members for rotating said second member as said valve is shifted to rotate said valve through said deflectable means, and means biasing said mating means into constant engagement for returning the second member to starting position upon completion of the axial shifting movement.

16. A valve-rotating device adapted to be interposed between the closure spring and spring retainer of a poppet valve assembly which comprises a first washer bottomed on said spring, a second washer opposed to said first washer, mating inclined cam surfaces on said washers, a dished spring between said second washer and said spring retainer, said dished spring engaging the periphery of the first washer and an intermediate portion of the second washer when said valve is closed by said closure spring but being deflectab'e away from the peripheral portion of the first washer when said closure spring exerts increased load on said first washer thereby shifting the cam surfaces thereof and causing said second washer to rotate for driving said valve, and torsion means maintaining said cam surfaces on the washers in mated engagement.

17. In a device for effecting relative rotation of members subjected to recurrent relative movements, the improvement which comprises a pair of opposed washers mounted for relative movements with said members and having mating circumferentially tapered lugs to effect relative rotations of said members as said washers are compressed, the lugs of one of said washers extending axially beyond the other washer into positions to carry loads from a superimposed member.

SAMUEL H. NORTON.

REFERENCES CITED

The following references are of record in the file of this patent:

UNITED STATES PATENTS

| Number | Name | Date |
| --- | --- | --- |
| 1,341,134 | Keller | May 25, 1920 |
| 1,467,991 | Anthony | Sept. 18, 1923 |
| 1,644,913 | Burgess et al. | Oct. 11, 1927 |
| 2,397,502 | Ralston | Apr. 2, 1946 |